US011815690B2

(12) United States Patent
Shahal et al.

(10) Patent No.: US 11,815,690 B2
(45) Date of Patent: Nov. 14, 2023

(54) HEAD MOUNTED DISPLAY SYMBOLOGY CONCEPTS AND IMPLEMENTATIONS, ASSOCIATED WITH A REFERENCE VECTOR

(71) Applicant: Elbit Systems Ltd., Haifa (IL)

(72) Inventors: Avner Shahal, Haifa (IL); Omer Hasharoni, Haifa (IL); Yuval Assaf, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 17/892,141

(22) Filed: Aug. 22, 2022

(65) Prior Publication Data

US 2022/0404624 A1 Dec. 22, 2022

Related U.S. Application Data

(63) Continuation of application No. 16/066,681, filed as application No. PCT/IL2016/051389 on Dec. 28, 2016, now Pat. No. 11,422,370.

(30) Foreign Application Priority Data

Dec. 29, 2015 (IL) .......................................... 243400

(51) Int. Cl.
*G02B 27/01* (2006.01)
*G06F 3/01* (2006.01)
*G09G 5/38* (2006.01)

(52) U.S. Cl.
CPC ....... *G02B 27/0172* (2013.01); *G02B 27/017* (2013.01); *G02B 27/0179* (2013.01);
(Continued)

(58) Field of Classification Search
CPC ............ G02B 27/0172; G02B 27/0179; G02B 27/017; G02B 2027/0187;
(Continued)

(56) References Cited

U.S. PATENT DOCUMENTS 7,046,215 B1 5/2006 Bartlett
2010/0238161 A1 9/2010 Varga
(Continued)

OTHER PUBLICATIONS

Douglas P. Meador et al: "Helmet display symbology development for the JAST/IHAVS flight demonstration", Proceedings SPIE 7513, 2009 International conference on optical instruments and technology, vol. 2735, Jun. 7, 1996, pp. 39-49.
(Continued)

*Primary Examiner* — Yaron Cohen
(74) *Attorney, Agent, or Firm* — PEARL COHEN ZEDEK LATZER BARATZ LLP

(57) ABSTRACT

Head mounted displays (HMD) and corresponding display methods are provided, which obtain, repeatedly, from a monitoring system of a vehicle and, a reference vector relating to the vehicle; display on the HMD a reference symbol that indicates the reference vector; and determine movements of a HMD symbology according to a spatial relation between a received user's line of sight (LOS) and the reference vector. For example, the vehicle may be an aircraft and the reference vector a flight path vector (FPV) received from the aircraft's avionics. The proposed HMD enhances the displayed information content while avoiding excessive movements of the symbology. The HMD's functional parameters may be pre-set or adapted according to user preference and flight stage characteristics. The reference symbol anchors most of the symbology, while minimal critical information may be moved along with the user's LOS, providing a clearer and more stable view through the HMD.

20 Claims, 7 Drawing Sheets

(52) U.S. Cl.
CPC .............. *G06F 3/012* (2013.01); *G06F 3/013* (2013.01); *G09G 5/38* (2013.01); *G02B 2027/0141* (2013.01); *G02B 2027/0187* (2013.01); *G09G 2354/00* (2013.01); *G09G 2380/12* (2013.01)

(58) Field of Classification Search
CPC . G02B 2027/0141; G06F 3/013; G06F 3/012; G09G 5/38; G09G 2380/12; G09G 2354/00
See application file for complete search history.

(56) References Cited

U.S. PATENT DOCUMENTS

| | | |
|---|---|---|
| 2012/0081236 A1 | 4/2012 | Best |
| 2014/0055846 A1 | 2/2014 | Wheeler |
| 2015/0002375 A1* | 1/2015 | Williams ........... G02B 27/0189 345/8 |
| 2015/0193018 A1 | 7/2015 | Venable |

OTHER PUBLICATIONS

Office action of IL Application No. 243400, dated Jun. 9, 2016.
Supplementary European Search Report for European Patent Application No. 16881409.3, dated Aug. 9, 2019.
Thomas W. Frey et al: "Virtual HUD using an HMD", Proceedings SPIE 7513, 2009 International conference on optical instruments and technology, vol. 4361, Aug. 22, 2001, pp. 251-262.

* cited by examiner

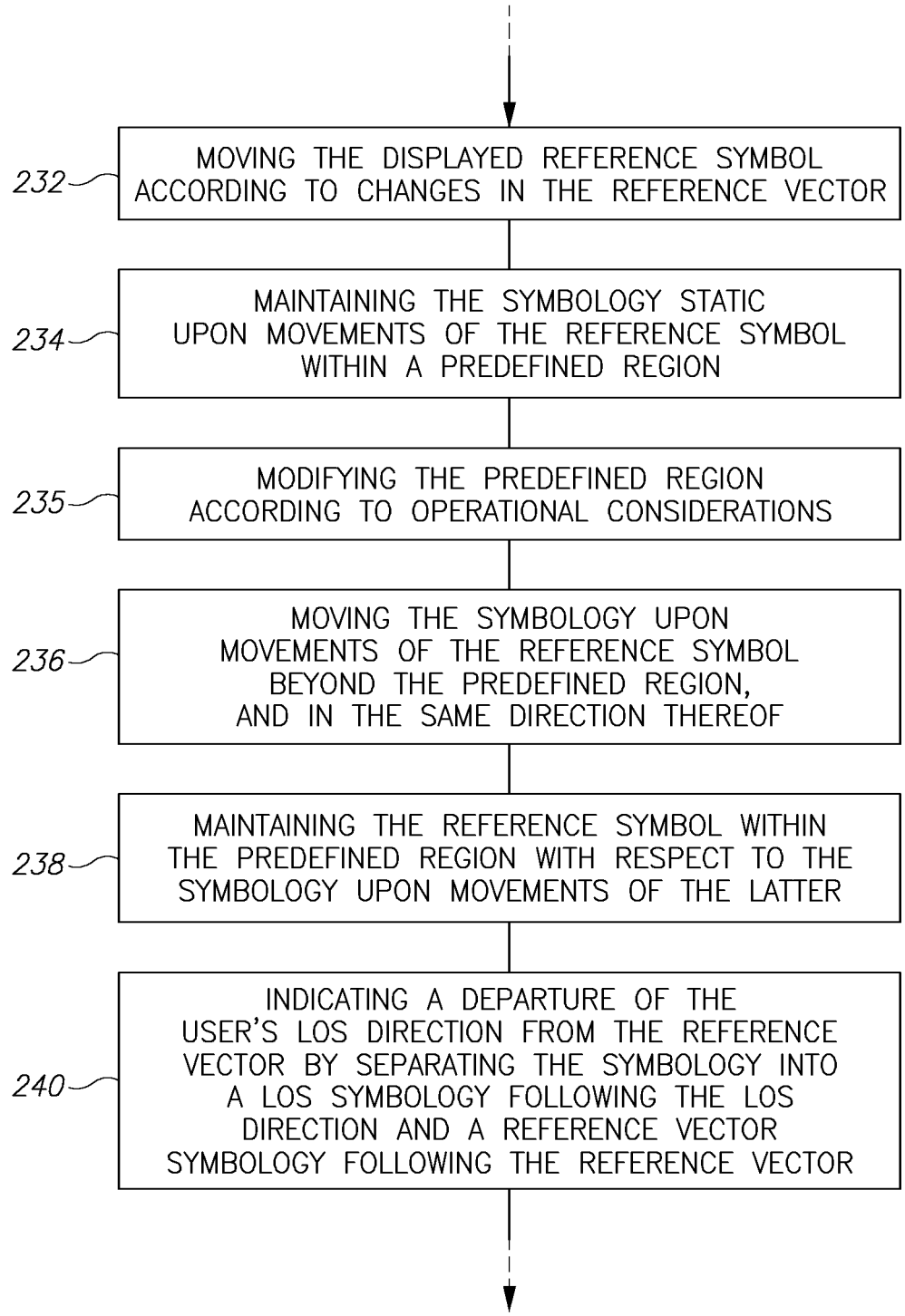
Figure 4 (cont. 1)

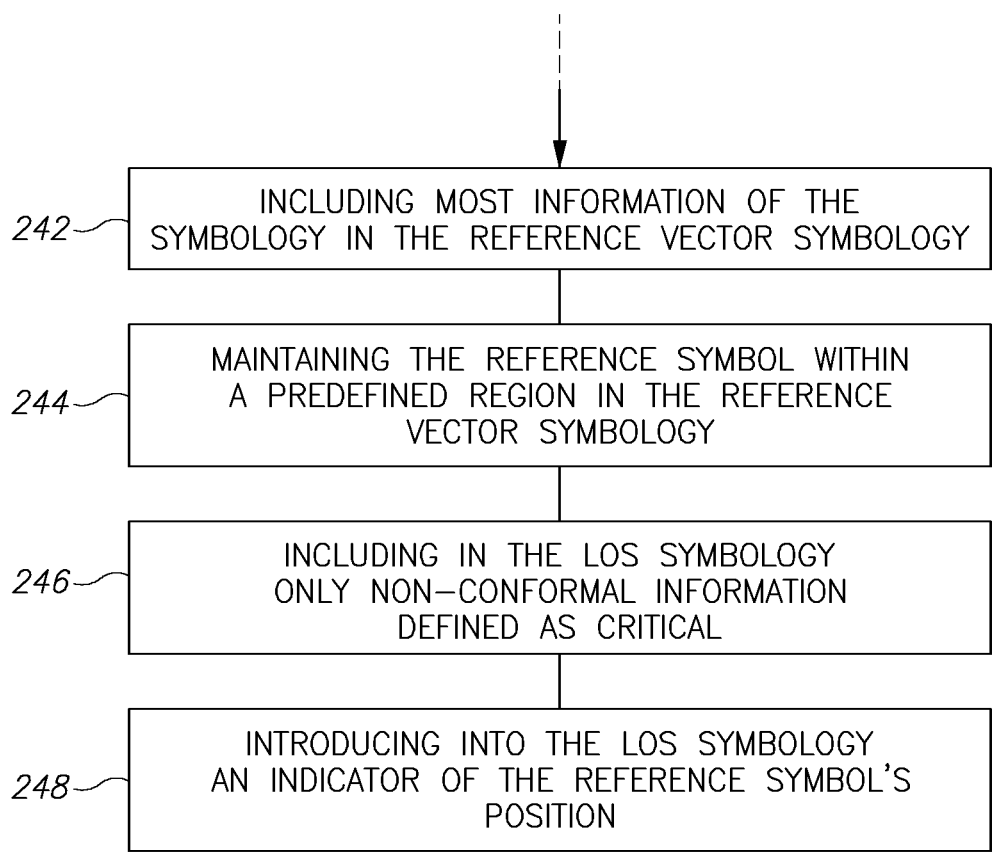
Figure 4 (cont. 2)

HEAD MOUNTED DISPLAY SYMBOLOGY CONCEPTS AND IMPLEMENTATIONS, ASSOCIATED WITH A REFERENCE VECTOR

CROSS REFERENCE TO RELATED APPLICATIONS

This Application is a continuation of U.S. patent application Ser. No. 16/066,681 filed on Jun. 28, 2018, which is a national phase of PCT Application No. PCT/IL2016/051389 filed on Dec. 28, 2016, which claims priority from Israeli Patent Application No. 243400 filed on Dec. 29, 2015, all of which are incorporated herein by reference in their entireties.

BACKGROUND OF THE INVENTION

1. Technical Field

The present invention relates to the field of head mounted displays, and more particularly, to virtual head up display symbologies.

2. Discussion of Related Art

Head mounted displays (HMD) such as helmet HMDs are used by pilots to receive flight information directly into their field of view and include symbologies that designate and present the corresponding data. Other HMDs such as HMD glasses are used by a variety of users in a variety of contexts, which include controlling various types of vehicles using the HMD to provide relevant information. The following patents and patent applications are incorporated herein by reference in their entirety: U.S. Pat. No. 7,046,215 which discloses a head tracker system for determining a user's head orientation relative to a datum, using a head mounting, an optical sensor, distinguishable markings and an optical correlator for optically correlating the optical image from the optical sensor with an optical image representative of the markings, with corresponding means for determining the orientation of the head mounting according to the correlation; U.S. Patent Publication No. 20150193018 which discloses positioning a target indicator using gaze tracking data having a coarse accuracy from a gaze tracking system of a computing device, receiving head pose data having a fine accuracy greater than the coarse accuracy from a head tracking system and using the gaze tracking data to determine an approximate user gaze region within a display region and display the target indicator at an initial location within the approximate user gaze region; U.S. Patent Publication No. 20100238161 which discloses a safety critical, time sensitive data system for projecting safety/mission critical data onto a display pair of Commercial Off The Shelf (COTS) light weight projection glasses or monocular creating a virtual 360° HUD (Heads Up Display) with six degrees of freedom movement; and U.S. Patent Publication No. 20150002375 which discloses aligning an image generated by an image display system by displaying to the user a first symbol on an image display, aligning the first symbol with a reference symbol, recording movement of the image display to align the first symbol with the reference symbol, displaying to the user at least one alternate symbol on the image display, aligning the alternate symbol with the reference symbol, recording movement of the image display to align the alternate symbol with the reference symbol, and determining magnification of a forward scene induced by the image intensifier from the recorded movement of the image display described above.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a head mounted display (HMD) comprising a line of sight (LOS) tracker and controlled by a display controller to present a user of a vehicle with a symbology, wherein the display controller is configured to receive a reference vector and determines movements of the symbology according to a spatial relation between a user's LOS as received from the LOS tracker and the reference vector.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figures 1A, 1B:
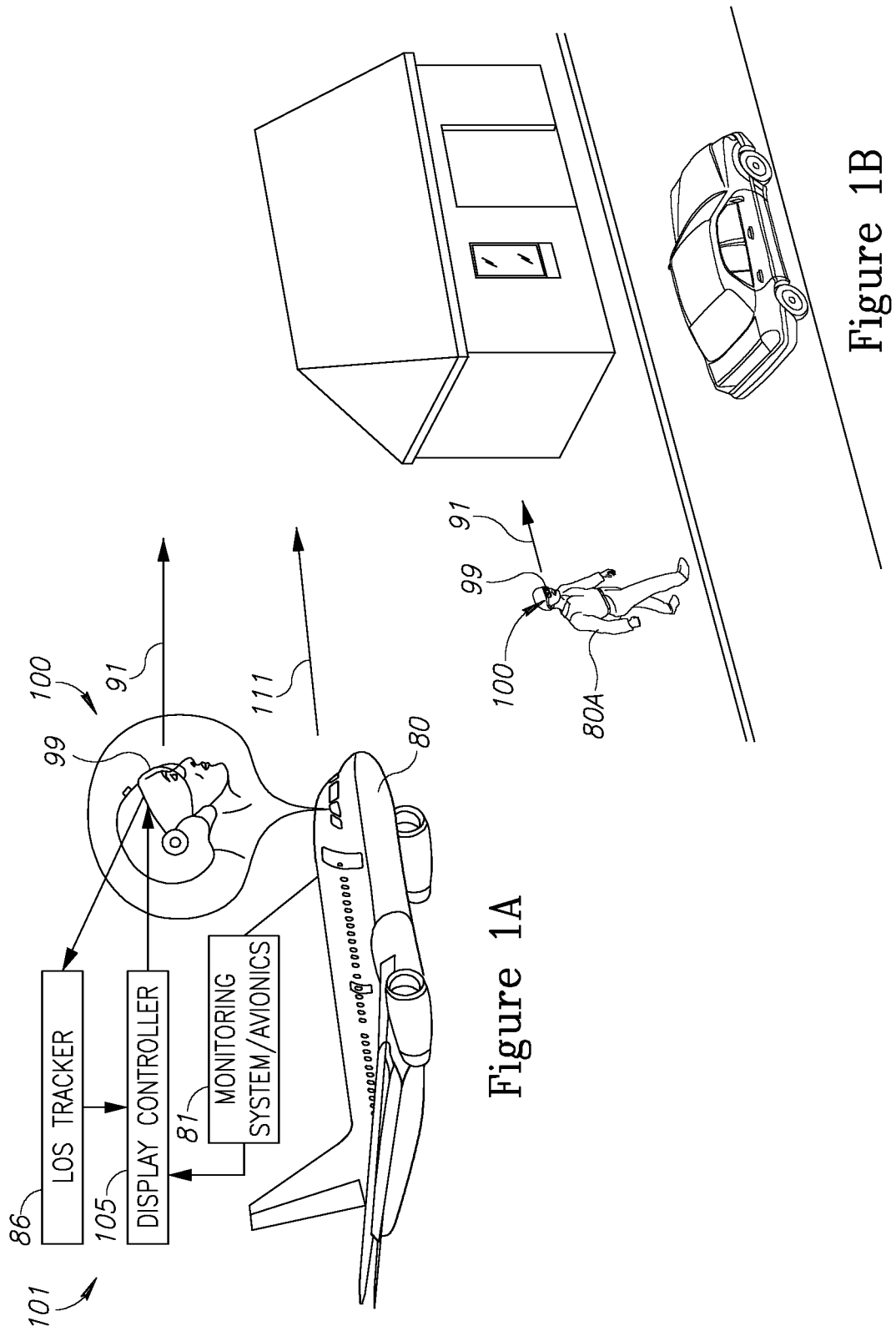
FIGS. 1A-1D are high level schematic diagrams of a HMD and its operation, according to some embodiments of the invention.

Prior to the detailed description being set forth, it may be helpful to set forth definitions of certain terms that will be used hereinafter.

The terms "line of sight tracker" or "LOS tracker" as used in this application refer to any unit which monitors a direction associated with a user's head, such as a head orientation or a gaze direction. As non-limiting examples, LOS trackers may be incorporated in a HMD, e.g. in a helmet, a visor, glasses etc. or may be associated or independent units. Correspondingly, the term "LOS" as used in this application refers to a direction associated with a user's head, such as a gaze direction, a head orientation or a combination thereof. It is noted that while the LOS may be tracked with respect to a moving platform, such as a vehicle, in relative, vehicle coordinates; and a conversion may be needed to express the LOS in absolute, world coordinates, the present application assumes this conversion is straightforward and does not distinguish, unless specifically discussing the conversion, between LOS in relative and absolute coordinates.

The term "reference vector" as used in this application refers to any direction that is external to the user's LOS, such as a body direction of a vehicle enclosing the user, a direction toward a user's aim (predefined or user-defined), a direction to external objects, a direction to a future location of the vehicle or the user and so forth. Similarly to the LOS, no distinction is made, unless stated otherwise at specific teachings, between relative and absolute coordinates of the reference vector, under the assumption that the conversion is straightforward to a person skilled in the art.

The term "monitoring system" of a vehicle, as used in this application, refers to any element that provides information concerning the vehicle. For example, the term "avionics" as used in this application as a non-limiting example for a monitoring system, refers to any element that provides information concerning an aircraft, such as various aircraft sensors, a flight management system (FMS), cameras etc.

With specific reference now to the drawings in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways. Also, it is to be understood that the phraseology and terminology employed herein is for the purpose of description and should not be regarded as limiting.

Head mounted displays (HMD) and corresponding display methods are provided, which track a user's line of sight (LOS) and present a user with a symbology, and also receive a reference vector and determine movements of the symbology according to a spatial relation between a user's LOS and the reference vector. The anchoring of the symbology with respect to the reference vector, possibly with some degree of freedom, stabilizes the symbology, particularly when the user is moving fast or is in a vibrating vehicle, and that improves the functionality of the HMD.

Head mounted displays (HMD) and corresponding display methods are provided, which obtain, repeatedly, from a monitoring system of a vehicle and, a reference vector relating to the vehicle; display on the HMD a reference symbol that indicates the reference vector; and determine movements of a HMD symbology according to a spatial relation between a received user's line of sight (LOS) and the reference vector. For example, the vehicle may be an aircraft and the reference vector may be a flight path vector (FPV) received from the aircraft's avionics. The proposed HMD enhances the displayed information content while avoiding excessive movements of the symbology. The HMD's functional parameters may be pre-set or adapted according to user preference and flight stage characteristics. The reference symbol anchors most of the symbology, while minimal critical information may be moved along with the user's LOS, providing a clearer and more stable view through the HMD. Proposed methods improve the legibility of the symbology (e.g., in a virtual head up display, VHUD) and enhance the functionality of HMDs.

FIGS. 1A-1D are high level schematic diagrams of a HMD 100 and its operation, according to some embodiments of the invention. As illustrated in FIG. 1A, HMD 100 may comprise a LOS tracker 86 and be controlled by a display controller 105 to present a user of a vehicle 80 (such as, in a non-limiting example, a pilot of an aircraft) with a symbology 90. Display controller 105 may be connected to a monitoring system 81 of vehicle 80 and may be configured to receive from monitoring system 81 a reference vector 111. HMD 100 may be further configured to display, via display controller 105, a reference symbol 110 that indicates reference vector 111 and to determine movements of symbology 90 according to a spatial relation between a user's LOS 91 as received from LOS tracker 86 and reference vector 111. It is noted that reference symbol 110 may be invisible in symbology 90 yet still be used as a stabilizing anchor thereto. For example, reference vector 111 may comprise an orientation of vehicle 80, a direction to a future point in the path of vehicle 80, possibly under repeated updating, a direction of a specific sub-system of vehicle 80, or any other operation direction related to vehicle 80. In the case of vehicle 80 being an aircraft, reference vector 111 may comprise the orientation (boresight) of aircraft 80, a flight path vector (FPV) of aircraft 80 (the direction to a point along the aircrafts expected trajectory), a flight path angle (FPA) of aircraft 80, a heading direction of aircraft 80, a direction to a target of aircraft 80 (e.g., a landing area, another airplane etc.) and so forth (see FIG. 1A), possibly adjustable by the user or by an external control system. HMD 100 and display controller 105 may be integrated together into a system 101, which may be at least partly integrated with monitoring system 81 such as aircraft's avionics 81. In certain embodiments, HMD 100 may comprise a VHUD 99 as the display component.

As illustrated in FIG. 1B, HMD 100 may be used by a person 80A (not being in a vehicle), e.g., a person using HMD 100 configured as a glasses-like device with display 99 (carried out using any method), with the body of person 80A being considered analogically to vehicle 80 which was referred to above. Reference vector 111 may comprise an orientation of person 80A's body, an orientation of a vehicle (e.g., bicycles, not shown) used by person 80A, as well as an orientation with respect to a target of person 80A or to a point of interest of person 80A. It is noted that in case of a vehicle-less person, HMD 100 may be similarly configured to comprise LOS tracker 86 and be controlled by display controller 105 to present symbology 90 to person 80A, wherein display controller 105 receives reference vector 111 from user 80A, from a monitor of the users movements (e.g., with respect to one or more body axis and movement direction), and/or with respect to the user's targets or points of interest etc.; and may be configured to display reference symbol 110 that indicates reference vector 111. Display controller 105 further determines movements of symbology 90 according to a spatial relation between user's LOS 91 as received from LOS tracker 96 and reference vector 111, e.g., to reduce or avoid vibrations of displayed symbology 90.

Figure 1C:
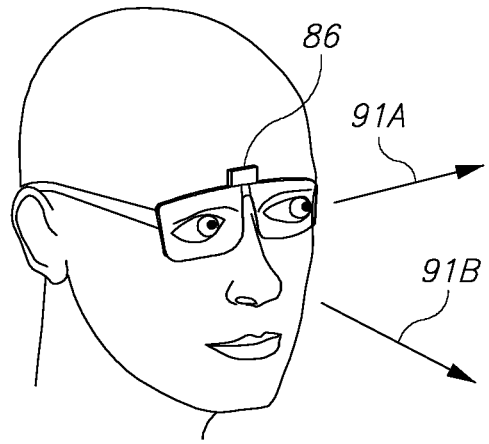

As illustrated in FIG. 1C, user's LOS 91 may be defined as a user's gaze direction 91B, a user's head orientation 91A, or as any combination thereof, optionally adjustable during operation and depending on specific scenarios. LOS tracker 86 may track either or both of user's head orientation 91A and user's gaze direction 91B, e.g., according to specified rules.

Figure 1D:
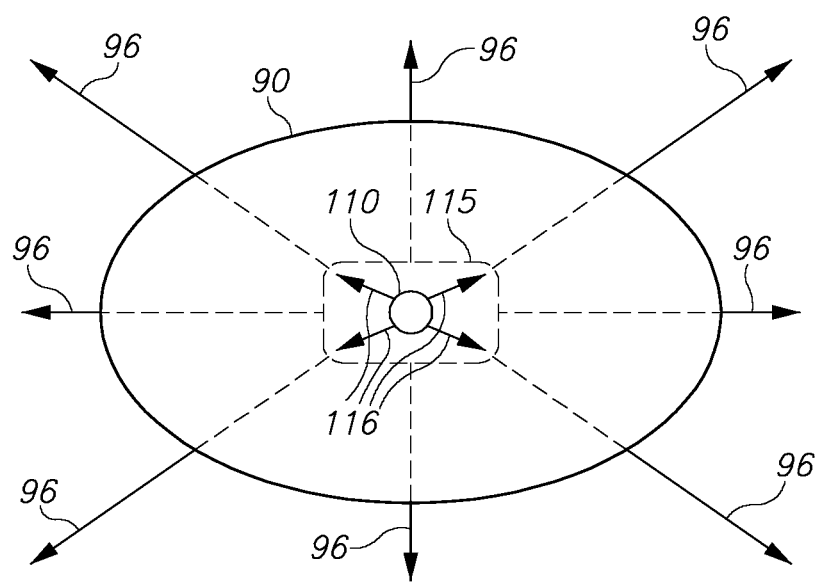

As illustrated in FIG. 1D, display controller 105 may add reference symbol 110 (schematically illustrated as the small circle) to HMD symbology 90 (schematically illustrated as the large ellipse). Reference symbol 110 may be assigned a predefined region 115 on the display (e.g., a central region, represented by the thin broken rectangle) in which reference symbol 110 may move 116 (arrows 116 denoting exemplary alternative motion directions of reference symbol 110 with respect to symbology 90) without any spatial change in the position of symbology 90. Such configuration provides additional important information to the user, without causing potentially confusing movements of symbology 90 within a certain tolerance range for vehicle reorientation. Moreover, symbology 90 may be displayed in a stable manner, with only reference symbol moving according to slight changes in the vehicle's orientation. That is, as long as user's LOS 91 is in the general direction of reference vector 111 (e.g., a vector indicating the vehicle's orientation or an aircraft's flight path vector), symbology 90 is presented in a stable manner and only reference symbol 110 moves with respect to symbology 90.

In case reference symbol 110 moves beyond predefined region 115 in the HMD display, symbology 90 may be moved 96 (arrows 96 denoting exemplary alternative motion directions for symbology 90, with solid line parts indicating real movements and broken line parts indicating symbology movements which are not performed but replaces with movements of reference symbol 110 within predefined region 115) together with reference symbol 110 in the corresponding direction. Reference symbol 110 may be configured to stay fixed with respect to symbology 90 during the motion (96) of the latter, e.g., on an edge of predefined region 115 which corresponds to the direction of symbology's movement 96, or alternatively at the center of predefined region 115, possibly depending on the rate of change of either or both of reference symbol 110 and symbology 90, which correspond to the relative movements of reference vector 111 and LOS direction 91, respectively.

It is noted that predefined region 115 may optionally be depicted in symbology 90 but would usually be invisible to the user and be merely a functional region that delimits movements 116 of reference symbol 110. In case the user wishes to adjust parameters of predefined region 115, it may become visible on the HMD display for the adjustment period. The reference symbol may be modified (automatically or manually) according to operational considerations such as a situation of vehicle 80 (e.g., a flight pattern of an aircraft) or user missions, with respect to its shape, color, size, temporal features etc. Symbology 90 may be centered with respect to reference symbol 110 and symbology vibrations may be reduced, to stabilize the symbology display, by anchoring symbology 90 on reference symbol 110, with some adjustable degree of freedom. In this manner, HMD 100 may enhance the situational awareness of the user.

Figure 2A:
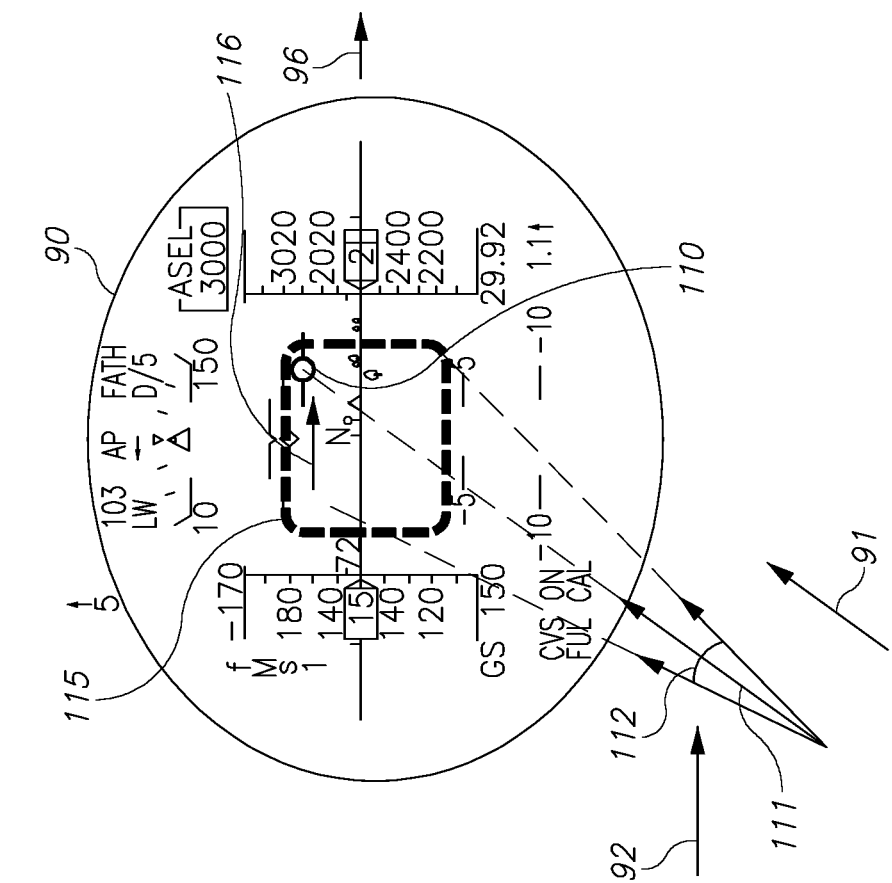
FIGS. 2A, 2B and 3 are high level schematic diagrams illustrating the operation of the MID, according to some embodiments of the invention.
Figure 2B:
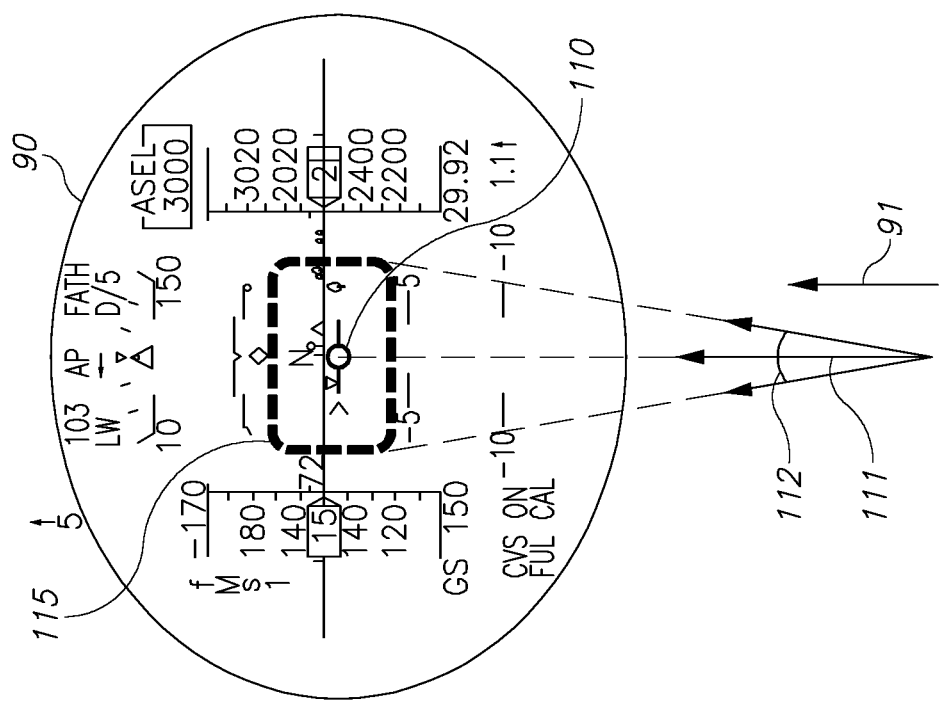
Figure 3:
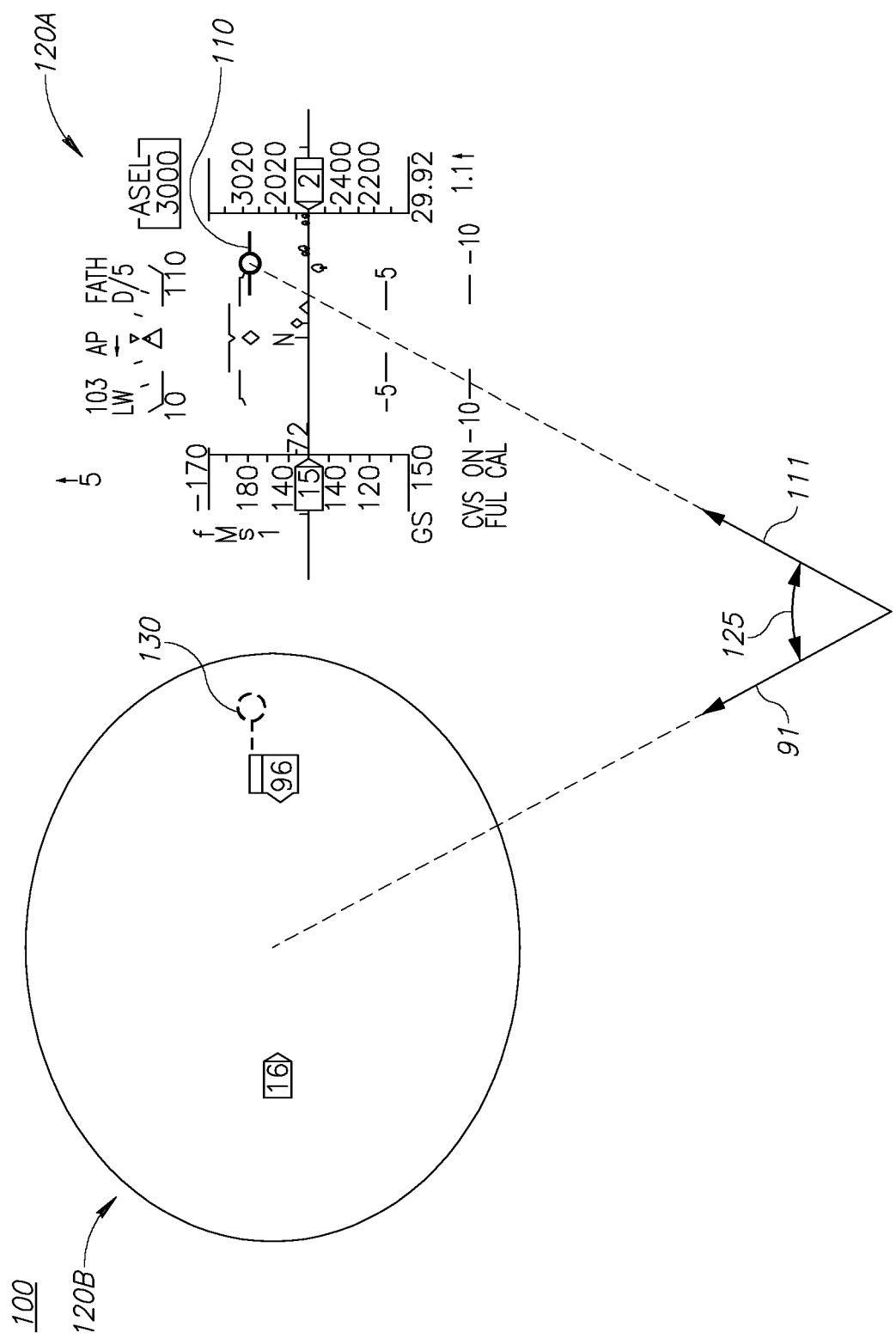

FIGS. 2A, 2B and 3 are high level schematic diagrams illustrating the operation of HMD 100, according to some embodiments of the invention. Reference symbol 110 is illustrated in these figures as a circle with two horizontal lines, thicker than its depiction in FIG. 1B.

Display controller 105 may be configured to maintain symbology 90 static upon movements of reference symbol 110 within a predefined region 115, e.g., a central region, as illustrated in FIG. 2A. The size (and possibly position, shape and other features) of predefined region 115 may be determined according to user preferences, may be adjusted by the user and/or may be adapted to the vehicle's operation mode and parameters, (e.g., to the aircraft's flight mode and its flight parameters). For example, predefined region 115 may be larger in cases that require higher user attention (to avoid unnecessary obstructions by movements 96 of symbology 90) and smaller in cases for which movements of reference symbol 110 are expected to be small (e.g., in order to indicate clearly any unexpected deviation), as illustrated e.g., in the different predefined regions 115 of FIGS. 2A and 2B. The situation illustrated in FIG. 2A represents a situation in which reference vector 110 is within a range 112 of user's LOS direction 91, which corresponds to the size of predefined region 115. It is noted that range 112 may be different in the vertical direction from range 112 in the horizontal direction, as in the illustrated case with horizontal rectangular predefined region 115 and may be modified with changes to the shape of predefined region 115.

Display controller 105 may be configured to move (96) symbology 90 upon movements (116) of reference symbol 110 (that corresponds to movements 92 of reference vector 111) beyond predefined region 115 on HMD 100, and in the same direction thereof, as illustrated schematically in FIG. 2B. Display controller 105 may be configured to maintain reference symbol 110 within predefined region 115 with respect to symbology 90 upon movements 96 of the latter, e.g., on the corresponding edge of predefined region 115 (as illustrated in FIG. 2B), at its center, or at an intermediate position, depending e.g., on the rate of movement 92 of reference vector 111. It is noted that reference symbol 110 may have different characteristics (e.g., form, size, color, temporal patterns etc.) to indicate different types of reference vectors 111, different situations of the vehicle (e.g., different flight stages of an aircraft), various alerts relating to the absolute or relative orientation of reference vector 111 etc.

Display controller 105 may be configured to indicate a departure of user's LOS direction 91 from reference vector 111, e.g., as illustrated in FIG. 3, by separating HUD symbology 90 into two components—a LOS symbology 120B following user's LOS direction 91 and a reference vector symbology 120A following reference vector 110. In certain embodiments, most information of symbology 90 may be included in reference vector symbology 120A, as illustrated schematically in FIG. 3, possibly with reference symbol 110 being maintained within a predefined region in reference vector symbology 120A (e.g., corresponding to predefined region 115 before the split, or having different size and/or shape). LOS symbology 120B may comprise only non-conformal information defined as critical, e.g., altitude and speed information. The splitting of symbology 99 among symbologies 120A, 120B may be determined according to user's preferences and operational modes and/or be adjusted by the user or by display controller 105 and/or be adjusted according to predefined display system characteristics (e.g., a head angle deviation from an aircraft boresight). LOS symbology 120B may comprise an indicator 130 of the position of reference symbol 110 e.g., indicator 130 may comprise a graphical element (such as a ghost symbol, illustrated by the broken line, a pointer, an arrow, a blinking element etc.) indicating the position of reference symbol 110 in reference vector symbology 120A.

Figure 4:
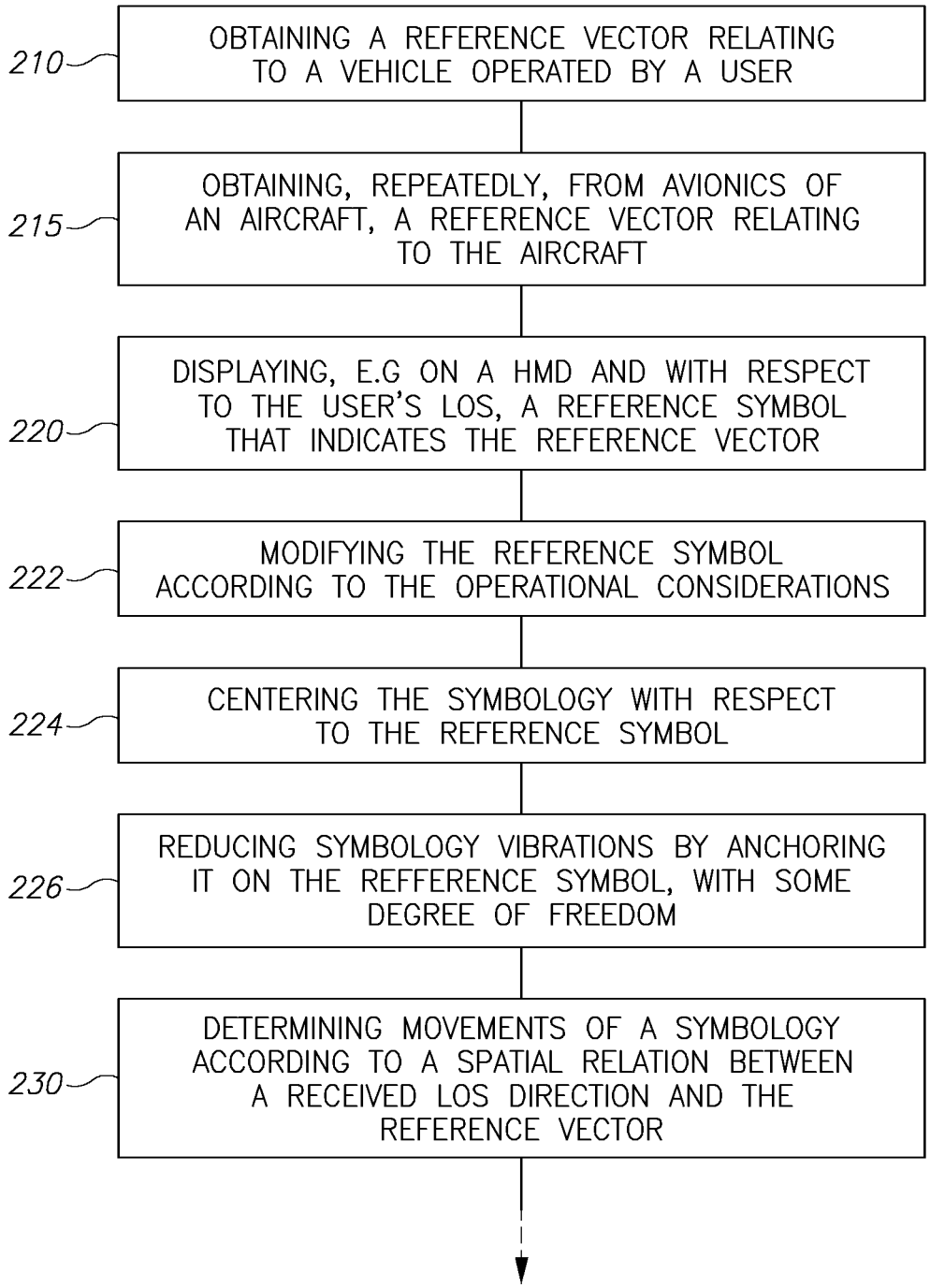
FIG. 4 is a high level schematic flowchart illustrating a method, according to some embodiments of the invention.

FIG. 4 is a high level flowchart illustrating a method 200, according to some embodiments of the invention. Method 200 relates to the display on a HMD, and may be at least partially implemented by at least one computer processor, e.g., in HMD 100, in VHUD 99 and/or in vehicle's monitoring system 81 such as aircraft's avionics system 81. Certain embodiments comprise computer program products comprising a computer readable storage medium having computer readable program embodied therewith and configured to carry out of the relevant stages of method 200.

HMD display method 200 may comprise obtaining, repeatedly, a reference vector relating to a vehicle operated by a user, from a monitoring system of the vehicle (stage 210), displaying, on a HMD, a reference symbol that indicates the reference vector (stage 220) and determining movements of a HMD symbology according to a spatial relation between a received user's LOS and the reference vector (stage 230). In certain embodiments, method 200 may comprise obtaining, from avionics of an aircraft and repeatedly, a reference vector (e.g., a flight path vector or a vector indicating the aircraft's orientation) relating to the aircraft (stage 215).

Method 200 may comprise modifying the reference symbol according to operational considerations (stage 222). Method 200 may comprise centering the symbology with respect to the reference symbol (stage 224) and reducing symbology vibrations (i.e., stabilizing the symbology display) by anchoring the symbology on the reference symbol, with some degree of freedom (stage 226).

In certain embodiments, method 200 may further comprise moving the displayed reference symbol according to changes in the reference vector (stage 232) while maintaining the symbology static upon movements of the reference symbol within a predefined region (e.g., a central region) on the display (stage 234) and moving the symbology upon movements of the reference symbol beyond the predefined region, and in the same direction thereof (stage 236). Optionally, method 200 may comprise maintaining the reference symbol within the predefined region with respect to the symbology upon movements of the latter (stage 238). Method 200 may comprise modifying the predefined region according to operational considerations (stage 235), such as situation of the vehicle, operations of the user etc.

In certain embodiments, method 200 may further comprise indicating on the display a departure of the user's LOS direction from the reference vector by separating the symbology into two components—a LOS symbology following the user's LOS direction and a reference vector symbology following the reference vector (stage 240). Method 200 may comprise any of: including most information of the symbology in the reference vector symbology (stage 242), maintaining the reference symbol within a predefined region in the reference vector symbology (stage 244), including in the LOS symbology only non-conformal information defined as critical (stage 246) and introducing into the LOS symbology an indicator of the reference symbol's position (stage 248), such as a pointer, a ghost image or any other indicator of the position of the reference symbol in the reference vector symbology.

In certain embodiments, method 200 may comprise receiving a reference vector (stage 210) and determining movements of the HMD symbology according to a spatial relation between a received user's LOS and the reference vector (stage 230). For example, the reference vector may be received from the user, with respect to a user's aim such as a landing place or another airplane. The user may be a person that is not related to a vehicle, defining the reference vector according to a point of interest, while the method moves the symbology with respect to the reference vector, which may be part of the symbology or invisible thereon. The reference vector may be defined with respect to a direction of movement of the person, with respect to the person's target or any external object.

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A head mounted display (HMD) for stabilizing a symbology according to a reference vector by anchoring the symbology to the reference vector, said HMD comprising:
   a line of sight (LOS) tracker; and
   a display controller configured to present the symbology to a user of a vehicle based on LOS of the user received from the LOS tracker,
   wherein the display controller receives the reference vector and determines movements of the symbology according to a spatial relation between the LOS of the user as received from the LOS tracker and the reference vector,
   wherein the display controller is further configured to anchor to the reference vector at least part of the symbology, in a case that the HMD is moving fast or vibrating, while rest of the symbology is moved along with the LOS of the user, to provide a clearer and more stable view to the user through the HMD,
   wherein the display controller is configured to display a reference symbol that indicates the reference vector, maintain the symbology static upon movements of the reference symbol within a predefined region and further move the symbology upon movements of the reference symbol beyond the predefined region, and in a same direction thereof.

2. The HMD of claim 1, wherein the display controller is connected to and configured to receive the reference vector from a monitoring system of the vehicle.

3. The HMD of claim 1, wherein the display controller is configured to calculate the reference vector from user input.

4. The HMD of claim 1, wherein the display controller is further configured to display a reference symbol that indicates the reference vector.

5. The HMD of claim 4, wherein the display controller is configured to move the displayed reference symbol according to changes in the reference vector.

6. The HMD of claim 4, wherein the display controller is configured to maintain the symbology static upon movements of the reference symbol within a predefined region.

7. The HMD of claim 6, wherein the display controller is configured to move the symbology upon movements of the reference symbol beyond the predefined region, and in the same direction thereof.

8. The HMD of claim 7, wherein the display controller is configured to maintain the reference symbol within the predefined region with respect to the symbology upon movements of the latter.

9. The HMD of claim 4, wherein the display controller is configured to indicate a departure of the user's LOS from the reference vector by separating the symbology into two components—a LOS symbology following the user's LOS and a reference vector symbology following the reference vector.

10. The HMD of claim 9, wherein most information of the symbology is included in the reference vector symbology.

11. The HMD of claim 9, wherein the reference symbol is maintained within a predefined region in the reference vector symbology.

12. The HMD of claim 9, wherein the LOS symbology comprises only non-conformal information defined as critical.

13. The HMD of claim 9, wherein the LOS symbology comprises an indicator of a position of the reference symbol.

14. The HMD of claim 5, wherein the display controller is connected to and configured to receive the reference vector from a monitoring system of the vehicle and wherein the vehicle is an aircraft, the user is a pilot of the aircraft, and the monitoring system comprises avionics of the aircraft.

15. The HMD of claim 14, wherein the reference vector is a flight path vector (FPV) or a vector indicating an orientation of the aircraft or a direction to a future point in the path of the aircraft or any other operation direction related to the aircraft.

16. A system comprising the HMD of claim 1 and the display controller.

17. A method of stabilizing a symbology displayed over a head mounted display (HMD) according to a reference vector by anchoring the symbology to the reference vector, method comprising:

repeatedly tracking a line of sight (LOS) of a user of a vehicle using a LOS tracker;

presenting the symbology to the user of the vehicle, based on the LOS of the user received from the LOS tracker;

receiving the reference vector and determining movements of the symbology according to a spatial relation between the LOS of the user as received from the LOS tracker and the reference vector, anchoring to the reference vector, at least part of the symbology, in a case that the HMD is moving fast or vibrating, while moving rest of the symbology along with the LOS of the user, to provide a clearer and more stable view to the user through the HMD;

displaying a reference symbol that indicates the reference vector;

maintaining the symbology static upon movements of the reference symbol within a predefined region; and moving the symbology upon movements of the reference symbol beyond the predefined region, and in a same direction thereof.

18. The method of claim 17, wherein the display controller is connected to and configured to receive the reference vector from a monitoring system of the vehicle.

19. The method of claim 17, wherein the display controller is configured to calculate the reference vector from user input.

20. The method of claim 17, wherein the display controller is further configured to display a reference symbol that indicates the reference vector.

* * * * *